United States Patent
Cicchello et al.

(10) Patent No.: US 11,068,823 B2
(45) Date of Patent: Jul. 20, 2021

(54) SYSTEM AND METHOD FOR RETAILER RISK PROFILING

(71) Applicant: Ontario Lottery and Gaming Corporation, Toronto (CA)

(72) Inventors: Ugo Cicchello, Sault Ste Marie (CA); Richard Guzzo, Sault Ste Marie (CA); Barbara Dool, Sault Ste Marie (CA)

(73) Assignee: Ontario Lottery and Gaming Corporation, Toronto (CA)

(*) Notice: Subject to any disclaimer, the term of this patent is extended or adjusted under 35 U.S.C. 154(b) by 1105 days.

(21) Appl. No.: 14/242,398

(22) Filed: Apr. 1, 2014

(65) Prior Publication Data

US 2014/0297360 A1  Oct. 2, 2014

(30) Foreign Application Priority Data

Apr. 2, 2013 (CA) ............................... CA 2811733

(51) Int. Cl.
  *G06Q 10/06* (2012.01)
  *G06Q 50/34* (2012.01)
  *G06Q 40/08* (2012.01)

(52) U.S. Cl.
  CPC ......... *G06Q 10/0635* (2013.01); *G06Q 50/34* (2013.01); *G06Q 40/08* (2013.01)

(58) Field of Classification Search
  CPC combination set(s) only.
  See application file for complete search history.

(56) References Cited

U.S. PATENT DOCUMENTS

| 8,458,069 | B2 * | 6/2013 | Adjaoute | G06Q 40/02 705/318 |
| 2006/0149580 | A1 * | 7/2006 | Helsper | G06Q 30/06 235/383 |
| 2012/0109807 | A1 * | 5/2012 | Lawrence | G06Q 30/02 705/35 |
| 2013/0179215 | A1 * | 7/2013 | Foster | G06Q 10/00 705/7.28 |

OTHER PUBLICATIONS

Office Action from counterpart Canadian Application No. 2,811,733, dated Nov. 6, 2014, 5 pp.

* cited by examiner

*Primary Examiner* — Rutao Wu
*Assistant Examiner* — Zahra Elkassabgi
(74) *Attorney, Agent, or Firm* — Shumaker & Sieffert, P.A.

(57) ABSTRACT

The lottery administration entity typically maintains a retail network of terminals that can be used to purchase tickets as well as validate tickets. Each transaction at the retail locations, whether it is purchasing tickets or validating tickets, may be stored in a database or other data store. The data store may be used to search for ticket information, such as when or where a particular ticket was purchased. The stored data may processed in order to generate a risk profile of retailers.

5 Claims, 11 Drawing Sheets

SYSTEM AND METHOD FOR RETAILER RISK PROFILING

This application claims priority to Canadian Application 2,811,733, filed Apr. 2, 2013. The entire content of Canadian Application 2,811,733 is incorporated herein by reference.

TECHNICAL FIELD

The current application relates to managing and using information in a lottery system, and in particular to determining a risk profile of retailers of the lottery system.

BACKGROUND

Lottery games may be administered by a central authority in accordance with local rules and regulations. The entity responsible for administering the lottery games may provide a number of games to the public. As an example, the lottery administration entity may provide sports related games that allow a player to wager on one or more sporting events, or may provide draw based lottery tickets or instant win type tickets. These types of games are only illustrative, and it should be appreciated that different types of games may also be offered. For example, a hybrid game may be offered that provides a combination of instant win tickets and draw-based tickets.

Regardless of the type of game a player decides to play, a ticket is commonly provided. The ticket may have a unique number, or unique combination of non-unique numbers, that associates the particular ticket information, such as the number of wagers or draws purchased, the predicted outcomes as well as any other additional information the lottery administering entity desires. In order to validate that a purchased ticket is a winner, the ticket may be scanned and the ticket information associated with the ticket retrieved and used to determine if the ticket is in fact a winner. Depending upon the size of the prize, a player may receive the prize directly from the retailer, or may be required to visit the administration entity in order to claim their prize.

The lottery administration entity typically maintains a retail network of terminals that can be used to purchase tickets as well as validate tickets. The retail terminals are commonly found at convenience stores, grocery stores and pharmacies, although they may be found in various locations. Each transaction at the retail locations, whether it is purchasing tickets or validating tickets, may be stored in a database or other data store. The data store may be used to search for ticket information, such as when or where a particular ticket was purchased. In order to ensure that retailers abide by the rules and regulations of the lottery organization, retailers may be periodically audited in order to determine their compliance with the rules and regulations.

It is desirable to have a lottery system that provides an improved, alternative or additional way to determine a risk profile of retailers, which may be used to determine retailers for further investigation or auditing.

SUMMARY

In accordance with the present disclosure there is provided a method for generating a risk profile of a retailer for a lottery organization. The method comprises accessing risk assessment information associated with a retailer identifier (ID) of a lottery retailer, the risk assessment information providing an indication of one or more risk infractions assessed against the lottery retailer, each of the one or more assessed risk infractions associated with a respective unique assessment type identifier (ID) of a plurality of predetermined assessment type IDs; accessing a retailer risk model defining a respective weighting value to apply to each one of the plurality of predetermined assessment type IDs; and determining a risk profile for the lottery retailer from the one or more assessed risk infractions and the weightings determined from the accessed retailer risk model.

In the method, determining the risk profile may comprise: determining a number of occurrences of each type of risk infraction in the risk assessment information; determining values for each type of risk infraction in the risk assessment information, each respective value determined based on the number of occurrences of the respective type of risk infraction and the weighting of the type of risk infraction in the risk profile; and determining an overall risk number as a summation of the individual values for each type of risk infraction in the risk assessment information.

In the method, the risk profile may define a respective first weighting value, a second weighting value and a threshold value for each one of the plurality of predetermined risk type IDs, and determining the respective values for each type of risk infraction in the risk assessment information may comprise determining the value as a product of the first weighting value and the number of occurrences of the respective type of risk infraction when the number of occurrences is less than or equal to the threshold associated with the respective type of risk infraction in the retailer risk profile; and determining the value as a sum of a first product of the first weighting value and the threshold associated with the respective type of risk infraction in the retailer risk profile and a second product of the second weighting value and a difference between the number of occurrences and the threshold when the number of occurrences of the type of the risk infraction is greater than the threshold associated with the respective type of risk infraction in the retailer risk profile.

In the method, the assessed one or more risk infractions may comprise one or more of a customer complaint assessment; an offence assessment; and a flagged transaction assessment.

In the method, the assessed one or more risk infractions may comprise at least one flagged transaction assessment based on transaction information received from the retailer.

In the method, each of the at least one flagged transaction assessment may be generated from processing transaction information, including accessing transaction information comprising at least one transaction associated with a unique transaction ID and a transaction type; retrieving one or more flagging criteria, each specifying an assessment type, a transaction type and transaction criteria, the one or more flagging criteria retrieved when the transaction type of the respective flagging criteria matches the transaction type of the at least one transaction of the transaction information; determining that the transaction criteria of at least one of the retrieved flagging criteria matches characteristics of the at least one transaction of the transaction information; and generating the flagged transaction assessment with an assessment type of the flagging criteria associated with the transaction criteria matching the characteristics of the at least one transaction.

The method may further comprise determining an overall risk number for each of a plurality of retailers, each of the respective overall risk numbers determined as a summation of individual values of the respective retailer profile; and determining a ranking of each of the retailers based on the determined overall risk number of each of the retailers.

The method may further comprise receiving a query retailer ID; and displaying the risk profile associated with the received query retailer ID.

The method may further comprise receiving a selection of one of the assessment type IDs; and displaying details of the assessed risk infractions associated with the received query retailer ID having the selected assessment type ID.

The method may further comprise receiving updated risk assessment information; and updating the risk profile based on the updated risk assessment information.

In accordance with the present disclosure there is further provided a computing system comprising a processor for executing instructions; and a memory storing instructions for execution by the processor. The instructions when executed by the processor configure the computing system to perform a method comprising accessing risk assessment information associated with a retailer identifier (ID) of a lottery retailer, the risk assessment information providing an indication of one or more risk infractions assessed against the lottery retailer, each of the one or more assessed risk infractions associated with a respective unique assessment type identifier (ID) of a plurality of predetermined assessment type IDs; accessing a retailer risk model defining a respective weighting value to apply to each one of the plurality of predetermined assessment type IDs; and determining a risk profile for the lottery retailer from the one or more assessed risk infractions and the weightings determined from the accessed retailer risk model.

In the computing system, determining the risk profile may comprise determining a number of occurrences of each type of risk infraction in the risk assessment information; determining values for each type of risk infraction in the risk assessment information, each respective value determined based on the number of occurrences of the respective type of risk infraction and the weighting of the type of risk infraction in the risk profile; and determining an overall risk number as a summation of the individual values for each type of risk infraction in the risk assessment information.

In the computing system, the risk profile may define a respective first weighting value, a second weighting value and a threshold value for each one of the plurality of predetermined risk type IDs, and determining the respective values for each type of risk infraction in the risk assessment information may comprise determining the value as a product of the first weighting value and the number of occurrences of the respective type of risk infraction when the number of occurrences is less than or equal to the threshold associated with the respective type of risk infraction in the retailer risk profile; and determining the value as a sum of a first product of the first weighting value and the threshold associated with the respective type of risk infraction in the retailer risk profile and a second product of the second weighting value and a difference between the number of occurrences and the threshold when the number of occurrences of the type of the risk infraction is greater than the threshold associated with the respective type of risk infraction in the retailer risk profile.

In the computing system, the assessed one or more risk infractions may comprise one or more of a customer complaint assessment; an offence assessment; and a flagged transaction assessment.

In the computing system, the assessed one or more risk infractions comprise at least one flagged transaction assessment based on transaction information received from the retailer.

In the computing system, each of the at least one flagged transaction assessment may be generated from processing transaction information, including accessing transaction information comprising at least one transaction associated with a unique transaction ID and a transaction type; retrieving one or more flagging criteria, each specifying an assessment type, a transaction type and transaction criteria, the one or more flagging criteria retrieved when the transaction type of the respective flagging criteria matches the transaction type of the at least one transaction of the transaction information; determining that the transaction criteria of at least one of the retrieved flagging criteria matches characteristics of the at least one transaction of the transaction information; and generating the flagged transaction assessment with an assessment type of the flagging criteria associated with the transaction criteria matching the characteristics of the at least one transaction.

In the computing system, the method performed by the execution of the instructions may further comprise determining an overall risk number for each of a plurality of retailers, each of the respective overall risk numbers determined as a summation of individual values of the respective retailer profile; and determining a ranking of each of the retailers based on the determined overall risk number of each of the retailers.

In the computing system, the method performed by the execution of the instructions may further comprise receiving a query retailer ID; and displaying the risk profile associated with the received query retailer ID.

In the computing system, the method performed by the execution of the instructions may further comprise receiving a selection of one of the assessment type IDs; and displaying details of the assessed risk infractions associated with the received query retailer ID having the selected assessment type ID.

In the computing system, the method performed by the execution of the instructions may further comprise receiving updated risk assessment information; and updating the risk profile based on the updated risk assessment information.

BRIEF DESCRIPTION OF THE DRAWINGS

Embodiments are described herein with references to the appended drawings, in which.

DETAILED DESCRIPTION

Figure 1:
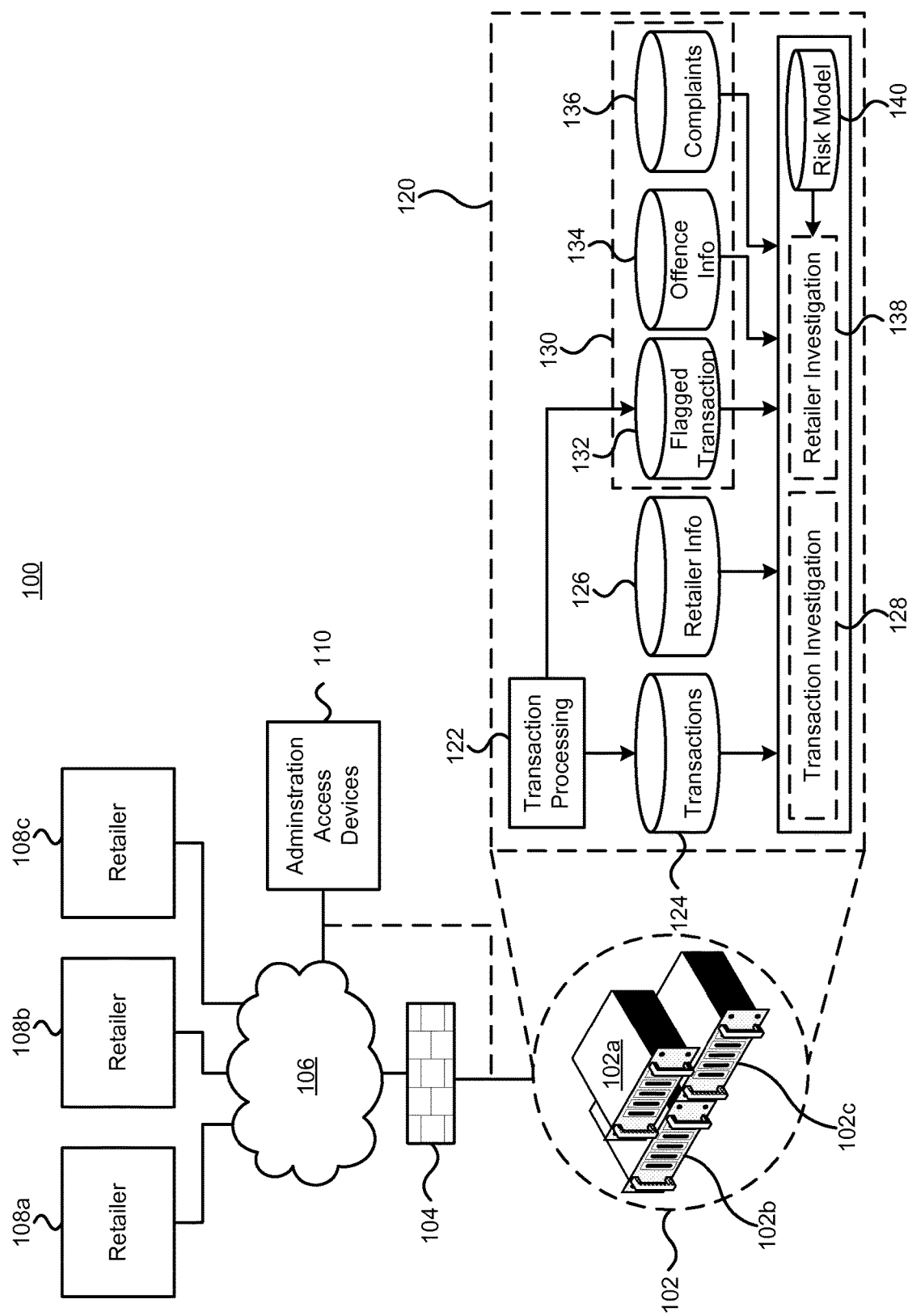
FIG. 1 depicts an information management system within a lottery system.

A lottery corporation may provide numerous different lottery games. The games may be purchased at different retail locations. In order to ensure that the public purchasing the lottery games has confidence in the lottery corporation, various rules and regulations are applied to retailers. For example, retailers are not supposed to play lottery games at work. Additional examples of retailer rules or regulations include having enough money available to pay for winning lottery tickets. While the majority of retailers abide by the rules and regulations, even a small number of retailers that break the rules or regulations may compromise the public's confidence in the lottery system. For example even a small number of retailers that attempt to defraud either the public or the lottery organization of winnings may undermine the lottery system. As such, the lottery organizations may periodically investigate retailers to ensure that they are complying with all the rules and regulations. As described further herein, by identifying potentially risky behavior of a retailer, a risk profile can be generated and used to identify possible retailers for further investigation.

Each retailer may sell different lottery games. Lottery games may include different types of game play, such sports wagers, draws and instant win games. Regardless of the type of the game, a player purchases a ticket, typically from a retail location. The ticket may be associated with a unique identifier that can be subsequently used to determine if the ticket is a winner. The unique identifier may be associated with game and ticket information which may vary depending upon the game played. For example for lottery draw tickets, the ticket information may include an indication of the selected numbers that can then be checked against the actual numbers drawn. As will be appreciated, numbers are typically drawn; however other types of symbols, colors or objects could be used in place of numbers. For sports wager tickets, the ticket information may include an indication of which sports games are being wagered on as well as the outcomes. For instant win tickets, the ticket information may provide an indication of the prize of the ticket. Although the tickets are described as having a unique identifier that is used to associate the physical ticket with the ticket information, it is possible that the physical ticket itself includes the ticket information encoded on it. Regardless of if the ticket information is directly encoded onto the ticket, or if it is associated with the ticket through a ticket identifier, it typically can be retrieved by scanning a barcode of on the ticket.

Interactions with the lottery system may be stored to a central database or data store. The transactions stored in the lottery system may represent interactions with the lottery system, such as purchasing of tickets and validating tickets. As described further herein, the transaction information may be used to identify potentially risky behavior at a retailer and to build a risk profile of the retailers. By building a risk profile for the retailers in the lottery system, the lottery organization can identify potentially risky behavior of retailers in order to proactively manage the risk of retailers who break the rules or regulations.

The following describes various information, including transaction information, retailer information, information on flagged transactions, offence information, information on complaints, information on a risk model, information on flagging criteria, and retailer risk profile information. The information is depicted as being stored in separate databases; however, it is contemplated that the information can be stored in a larger or smaller number of databases. Additionally or alternatively, certain information may be stored in other structures such as a file. Further still, certain information may be hard-coded into the functionality provided.

FIG. 1 depicts an information management system within lottery system. The lottery system 100 comprises a plurality of interconnected components. A computing system 102 is depicted as providing a central location for storing and processing of lottery system information. The computing system 102 may be provided by one or more physical computers 102a, 102b, 102c each comprising at least one processor for executing instructions stored in an associated memory. The computing system 102 may be secured from unauthorized access through one or more components including a firewall 104 that controls the flow of information between an internal network and the external network 106. Although described as being provided at a single location, the computing system 102 may be provided by a number of separately located computing systems coupled together by a secure connection, or other network connection. Additionally or alternatively still, one or more backup and/or failover computing systems may be provided in order to provide for a highly available computing system.

A plurality of external devices can communicate and interact with the computing system 102 over the network 106. The lottery system may comprise a plurality of retail locations 108a, 108b, 108c (referred to collectively as retail locations 108). Each of the retail locations 108 may include one or more retail terminals for the purchase and validation of tickets. The retail terminals at the retail locations 108 may communicate with the computing system 102 in order to send and receive ticket information, whether it is in regard to tickets that are being purchased, validated, redeemed or exchanged. Additionally, ticket validation devices may be provided in various retail locations. The ticket validation devices allow a ticket to be validated in order to determine if it is a winner or not. Each of the retail locations 108 may be assigned a unique retail identifier (ID) that is used to uniquely identify transactions that occur in the retail location.

The retail locations 108 may further comprise instant win devices. As will be appreciated, instant win tickets typically comprise scratch tickets that are printed at a location and distributed to the retailer locations. The instant win tickets are typically distributed to retailers in a number of packs of tickets. Each pack must be activated before the ticket can be sold and redeemed. Further the packs are tracked as they are distributed. The tracking and activation information may be provided by the instant win ticket devices.

Administrative access devices 110 may be used to communicate with the computing system 102. The administrative access devices 110 may be a typical computing device such as a laptop, personal computer, tablet computer or smartphone. The administration access devices 110 allow administrative tasks to be accomplished, such as controlling user access, maintaining support information such as insider information and retailer information. The administrative access devices 110 may be located either on an external side of the firewall 104 or on the internal side.

Various information can be generated and stored by the lottery system 100. Further each interaction with the computing system may generate a transaction that is stored. The transaction information may be stored in order to meet regulatory requirements, business objectives, gaming requirements, or other requirements. Transactions associated with certain ticketing events may be processed in order to link a transaction with a previous transaction. The linked transaction information may also be stored and subsequently used to provide a transaction profile of a ticket facilitating easy investigation of a ticket, and enabling a lottery administration entity to provide new features, such as reprinting of lost tickets or miss-printed tickets as well as verification of purchasers for large prize tickets. Further, the transaction information can be used to flag transaction that may be indicative of risky retailer behavior. For example, a lottery corporation may have regulations against retail employees from playing lottery games while at work. This type of behavior may be flagged by transactions which indicate that the lottery ticket was purchased and verified a number of hours later at the same retail location.

The transaction linking, generation of a ticket's transaction profile and building a risk profile of a retailer may be done by information management functionality 120 provided by the computing system 102. The information management functionality 120 includes functionality for processing transactions 122. The transaction processing functionality 122 may include functionality for receiving and storing transactions. For example, when a customer purchases a lottery ticket from a retailer, a transaction can be generated, which would include an identifier of the retailer, and the transaction processing functionality 122 may receive the transaction and store it in a transaction database 124. The transaction processing functionality 122 may further attempt to link a received transaction to one or more previous transactions. The linked transaction information may also be stored in the transaction database 124. The information management functionality 120 may further comprise functionality for accessing and storing retailer information 126, such as retail location information, owner's name, employee information, as well as device identifiers located at the retail location. The transaction processing functionality 122 may also flag transactions if they are indicative of retailer behavior that is considered a risk. The flagged transactions may be stored in a flagged transaction database 132.

The information stored in the transaction database 124, and possibly the retail information database 126, may be accessed by investigation support functionality 128. The investigation support functionality 128 may generate a transaction profile of a ticket under consideration. The transaction profile, generated using the linked transaction information, may be used to help in identifying a specific ticket, verifying a purchaser of the ticket or other purposes as desired.

A retailer investigation component may generate a risk profile for individual retailers. The risk profile may be used to identify retail locations that are considered to be of a higher risk for behavior which could potentially defraud consumers, and as such may be used to identify retailers for further investigation by the lottery corporation. The retailer investigation functionality 138 may generate the retailer risk profile according to a risk model 140 that specifies weightings associated with different types of risk assessments. Risk assessment types specify the different types of risk infractions that may be assessed against a retailer.

Risk assessment information 130 may comprise three broad categories of assessments. As depicted, an assessment may include a flagged transaction which is generated when transaction information received from a retailer is indicative of some behavior that is considered to be of risk. An assessment may further include offences against the retailer. For example, a retailer may be charged with an offence if it is determined they broke a rule or rules of the lottery organization, such as failing to ID customers that appear to be younger than 25 years old, or charging additional fees. Further, an assessment may include consumer complaints against the retailer. As depicted, the assessment information 130 may be stored as individual databases 132, 134, 136, although it is contemplated that the assessment information 130 may be stored or represented in a number of different implementations.

The retailer investigation functionality 138 uses the risk model 140 and the assessment information to generate a risk profile for the retailers. In addition to the individual risk profiles, the retailer investigation functionality 138 may further determine averages of the risk profiles in order to provide relative information as to how one retailer's risk compares to another retailer's risk profile, or to the average risk profile. The overall risk information may be used for determining threshold values used in determining retailer risk profiles as described further.

Figure 2:
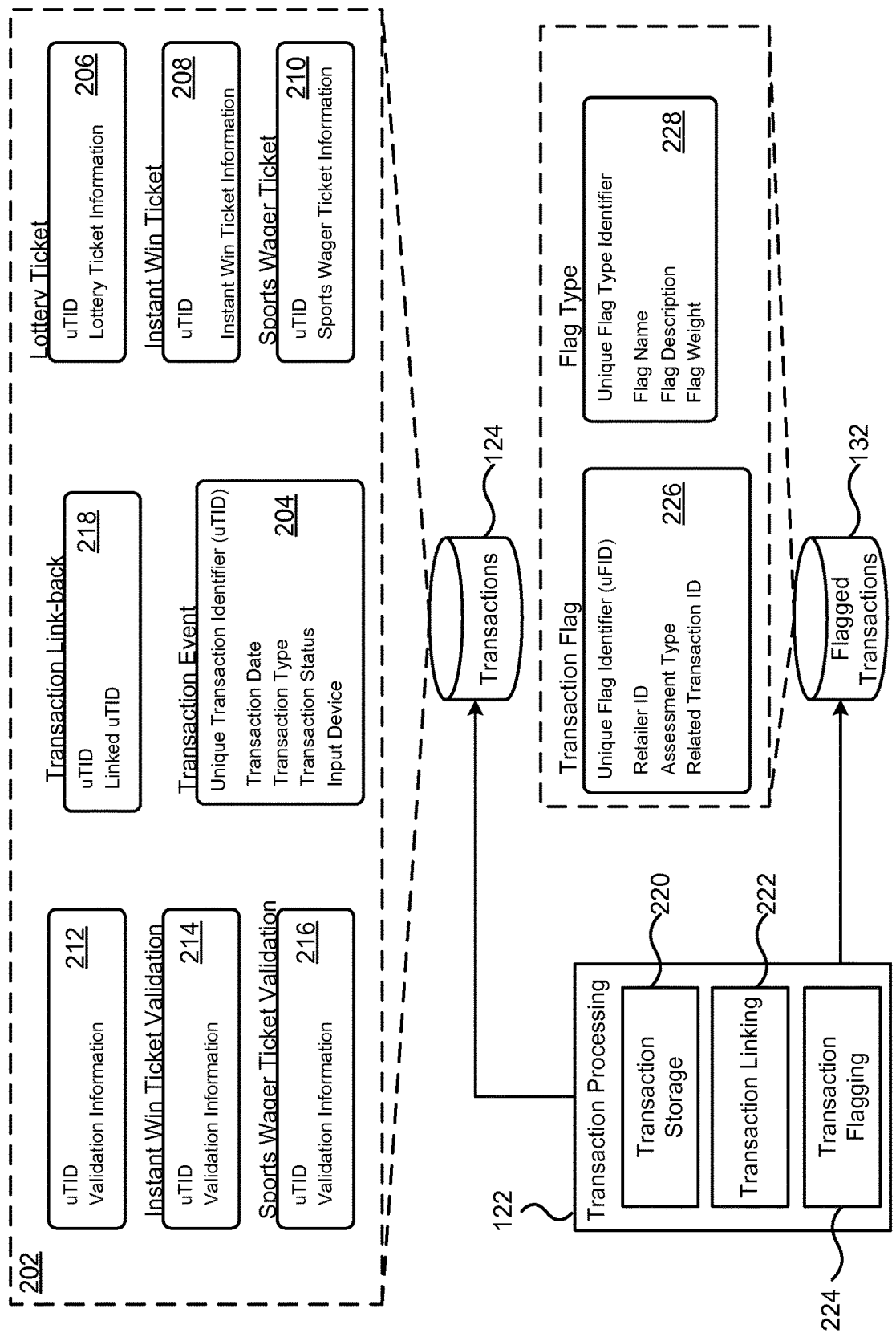
FIG. 2 depicts components of the information management system functionality.

FIG. 2 depicts components of the information management system functionality. In particular, FIG. 2 depicts the transaction processing functionality 122. As described above, the information management functionality 120 comprises transaction processing functionality 122 and a transactions database 124. The transaction processing functionality 122 may further flag transactions, which can be stored in the flagged transactions database 132. As depicted, the transaction database 124 may store the transaction information according to a data model 202.

As depicted, the data model 202 centers around a transaction event used to capture the common information of a transaction. A transaction is associated with an event in the lottery system. Different types of events, and so different types of transactions, are possible. For example, generating a new lottery ticket may be an event type that generates a corresponding transaction. Similarly, validating the lottery ticket may be another event type that generates a corresponding transaction. Broadly, ticket related transactions are grouped into generation events and validating events. The different generation events may further be grouped based on the type of ticket generated, such as whether it is the purchase of a draw lottery ticket, the purchase of an instant win ticket, or the purchase of a sports wager ticket. Further generation events, and corresponding transactions, may include the reprinting or reissuing of tickets, cancelling of tickets, and generation of an exchange ticket. Tickets may be reprinted if for example the numbers of have become illegible, or the ticket is ripped or otherwise compromised or if the original ticket was misprinted. Tickets may be cancelled, for example if a ticket was purchased in error, or if a ticket is lost. Cancelling tickets may have other restrictions such as only being able to do so on the same day the ticket was purchased and before the draw has occurred. An exchange ticket may be generated in situations where the ticket comprises a plurality of draws and one of the draws has concluded, and so a prize may be redeemed, while another draw on the ticket has not concluded. In such situations, the prize for the completed draw can be awarded, and the original ticket exchanged for another ticket with only the remaining un-concluded draws on the ticket.

As depicted, a transaction event table 204 may store information common to all transactions. The information includes a unique transaction identifier (uTID for brevity). The uTID is used to uniquely identify a particular transaction, and may also be used to associate additional information with the transaction. The transaction event table 204 may store additional information for each event. For example, it may store a date and time of the transaction, a type of the transaction, a status of the transaction and an input device that generated the transaction.

The uTID of a transaction can be used to associate the transaction event with specific information of the transaction according to the type of event that generated the transaction. The additional information may be stored in respective tables. As depicted, a lottery ticket table 206 may store a uTID and the lottery ticket information of the ticket. The lottery ticket information may include information specific to the draw based lottery ticket, such as the number of boards played, the selected numbers of each board, whether the numbers were selected by the lottery system or by the purchaser, whether the ticket is a new ticket, a re-purchase ticket where a player re-purchases the same selected numbers after validating a ticket, or whether the transaction is for cancelling a particular ticket. The lottery ticket information may include further information such as a retailer identifier identifying the location of the ticketing event and any other information desired by the lottery administration entity.

An instant win ticket table 208 stores transaction information associated with instant win lottery tickets. The instant win lottery tickets are typically scratch-off tickets. The instant win lottery ticket table 208 may store uTIDs of transactions and associated instant win ticket information. The instant win ticket information may include information about the type of game, the prize of the ticket as well as pack and activation information.

A sports wager ticket table 210 stores transaction information associated with sports wager tickets. The table 210 may store uTIDs of transactions and associated sports wager ticket information. The sports wager ticket information may include information about the type and amount of the wager, as well as specifics about the wager, such as the selected winners.

Separate ticket validation tables 212, 214, 216 may store validation information associated with validation events for draw based lottery tickets, sports wager tickets and instant win tickets. The validation information for each ticket type may provide information on the validation of tickets, such as where the ticket was validated, the result of the validation and the amount of the prize awarded.

In addition to the core transaction information, the ticket information and the validation information the transaction database 124 may further comprise a transaction link-back table 218. As described further, the transaction link-back table may associate a uTID of a transaction to a uTID of a linked transaction. The linked transaction is an associated transaction. As an example, a transaction for validating a ticket may be linked back to the transaction associated with the purchase of the ticket.

The information management functionality 120 further comprises the transaction processing functionality 122. The transaction processing functionality 122 comprises transaction storage functionality 220 that can receive a transaction or transaction information from retail locations or other locations within the lottery system 100. Once the transaction storage functionality 220 receives the transaction, or transaction information, it stores the transaction in the transaction database 124. In addition to the transaction storage functionality 220, the transaction processing functionality 120 further comprises transaction linking functionality 222. The transaction linking functionality 222 may receive transactions or transaction information, determine a previous transaction associated with the received transaction and then store the linked transactions together in the transaction link-back table 218. The transaction link-back table allows linked transactions to be quickly determined, allowing all events associated with a ticket to be quickly determined, retrieved and presented to a user.

The transaction processing functionality 120 receives transaction information associated with events in the lottery system 100 such as purchasing tickets, validating tickets, entering retailer complaints, as well as other events for which transaction information is stored. Depending upon the type of the transaction, it may be linked to previous, and related, transactions. The transaction processing functionality 120 may further provide functionality for flagging transactions as risky transactions. The transaction flagging functionality 224 may receive transaction information, which includes a transaction type. The transaction type may then be used to determine if that transaction type is associated with any possible risky transactions. If it is, the transaction is checked to determine if it matches the characteristics of a risky transaction. As an example, a transaction type may be associated with redeeming a free ticket of a winning ticket. This type of transaction may be associated with behavior that may indicate a higher risk of the retailer potentially defrauding a consumer if the winning ticket is associated with another prize, such as a cash prize, which was not redeemed. As such the transaction flagging component may check the additional characteristics of the transaction to determine if the transaction is a risky transaction. It is noted that although the transaction may be considered risky, it does not necessarily mean that the retailer is involved in fraudulent behavior, but rather is involved in what may be consider unusual behavior. In the example above, it is expected that a consumer would redeem all prizes for a ticket at the same time.

If the transaction is flagged as a potentially risky transaction, it may be stored in a flagged transaction database 132. A flagged transaction stored in the database 132 may store a unique flag (ID) that uniquely identifies the flagged transaction. The flagged transaction 226 may further include a retailer ID of the retailer the transaction occurred at, an assessment type which specifies the type of assessment, such as identifying that the assessment is for a 'split winning ticket'. The assessment types may be used in determining the weighting, or importance, of the assessment in the overall risk profile of the retailer. The flagged transaction 226 may further store the related unique transaction identifier. As described above, transactions may be linked together so that given a single transaction ID, all of the related or linked transactions can be determined. The flagged transaction database 226 may also store additional information such as flag type information 228 which stores information on the different assessment types, including an assessment type identifier, an assessment name, and description as well as a possible weight of the assessment type. As described further, the weighting information may additionally or alternatively be stored in a separate retailer risk model.

Figure 3:
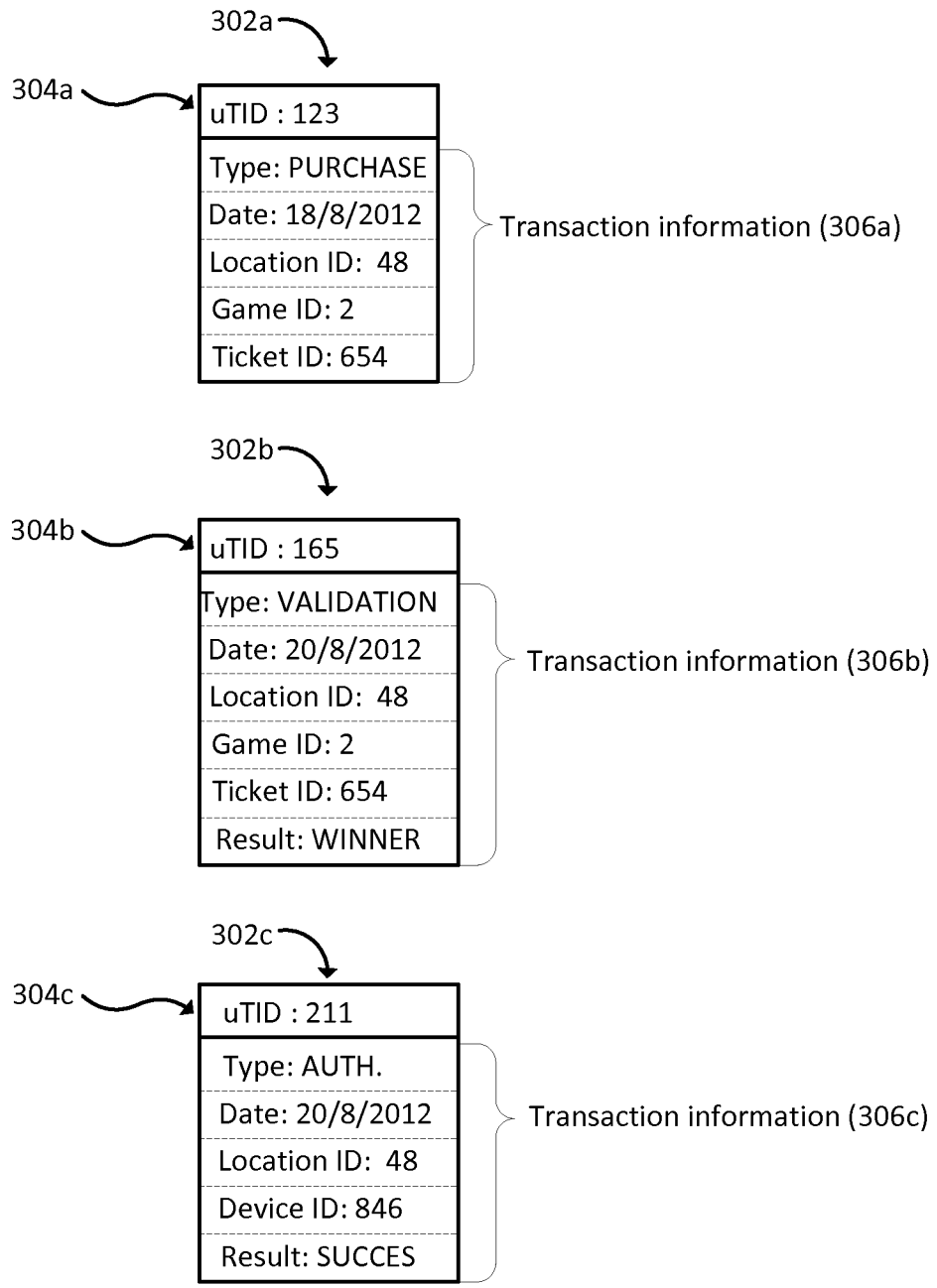
FIG. 3 depicts representations of illustrative transactions.

FIG. 3 depicts representations of illustrative transactions. Three different transactions 302a, 302b, 302c (referred to collectively as transactions 302) are depicted. Three different types of transactions are depicted. Each of the transactions 302 comprise a respective unique transaction identifier (uTID) 304a, 304b, 304c (referred to collectively as uTIDs 304) and respective transaction information 306a, 306b, 306c (referred to collectively as transaction information 306). The uTIDs 304 each uniquely identify a transaction and can be used in retrieving the associated transaction information 306. Each transaction may have common information, such as the transaction type, the date and/or time of the transaction and a location identifier, identifying the location of the transaction such as a particular retail location.

The first transaction 302a is depicted as a PURCHASE type transaction, which may be generated when a consumer purchases a new ticket, whether it is a lottery ticket, a sports wager ticket, an instant win ticket or other types of ticket. When a ticket is purchased, the transaction generated may include transaction information 306a that includes common transaction information, such as the transaction type, date and location ID as well as ticket specific information. It will be appreciated that the particular ticket specific information required to be stored may be dependent upon requirements of the different lottery administration entities and the particular ticket purchase. As an example, the ticket information is depicted as including a game identifier, which may identify the particular game type of the ticket and a ticket identifier that can be used to uniquely identify the ticket.

The second transaction 302b is depicted as a VALIDATION type transaction. The validation transaction may be generated when a consumer validates a purchased ticket at a ticket scanner, retail location or prize center. The transaction information 306b may include information identifying the ticket being validated such as the game ID and ticket ID as well as the result of the validation. The validation result is depicted as simply indicating if the ticket is a winner or not, although the result information may include additional information describing the actual prize won, such as a cash prize amount, a free ticket, or other prizes of the game. A portion of the transaction information, such as the game ID and ticket ID, may be used to locate the PURCHASE transaction 302a of the validated ticket.

The third type of transaction 302c is a non-ticket related transaction. That is, the transaction does not involve an event associated with a ticket. It may be viewed as an administrative event. For example retail terminals may be required to periodically authorize, or re-authorize their communication channel with the central location. The third transaction 302c is depicted as being an authorization (AUTH) type transaction. The transaction information 306c may include for example a device identifier that uniquely identifies the terminal device and the result of the authorization.

As will be appreciated, each transaction may include, or be linked to, additional information such as the location the transaction took place, the date of the transaction and time of the transaction. By linking related transactions together, a profile of the ticket's history can be created. As such, it may be possible to associate the ticket with a consumer allowing the purchaser of a winning ticket to be awarded the prize value, even if the ticket is lost and found by someone else.

As described above, certain transactions that are associated with ticketing events may be linked back to previous transactions. The type of transaction may indicate what type of transaction it will be linked back to. For example, a validation transaction is linked back to a ticket generation transaction, whether from a purchase, re-purchase or prize. Different link-back types may be used to link different transaction types. For example, a validation-to-original wager link-back type may link a validation transaction of a ticket to the transaction associated with the generation of the ticket. A free ticket-to-validation link-back type may link a prize ticket transaction with the validation transaction of the winning ticket. An exchange-to-validation link-back may link an exchange ticket transaction to a validation transaction of the ticket associated with the exchange ticket. An exchange ticket may be provided when a ticket has multiple games, one of which has concluded, such as an instant win game and one of which has not concluded such as a later occurring draw. An exchange ticket may be issued for the non-concluded games. A repurchase-to-validation link-back may link a repurchase of a ticket transaction to a validation transaction of the ticket. A promoX-to-promoY link-back may link a ticket transaction of a ticket received as a promotion for buying another ticket to the ticket transaction of the other ticket. The promotion may give a consumer a free game ticket if they purchase a particular other ticket. A cancel-to-original ticket link-back may link a cancellation transaction of a ticket to the ticket transaction. Tickets may be cancelled if for example they are lost, or for refunds. A reprint-to-original ticket link-back may link a reprinting transaction of a ticket to the ticket transaction. A reissue-to-original ticket transaction may link a reissuing transaction of a ticket to the ticket.

Figure 4:
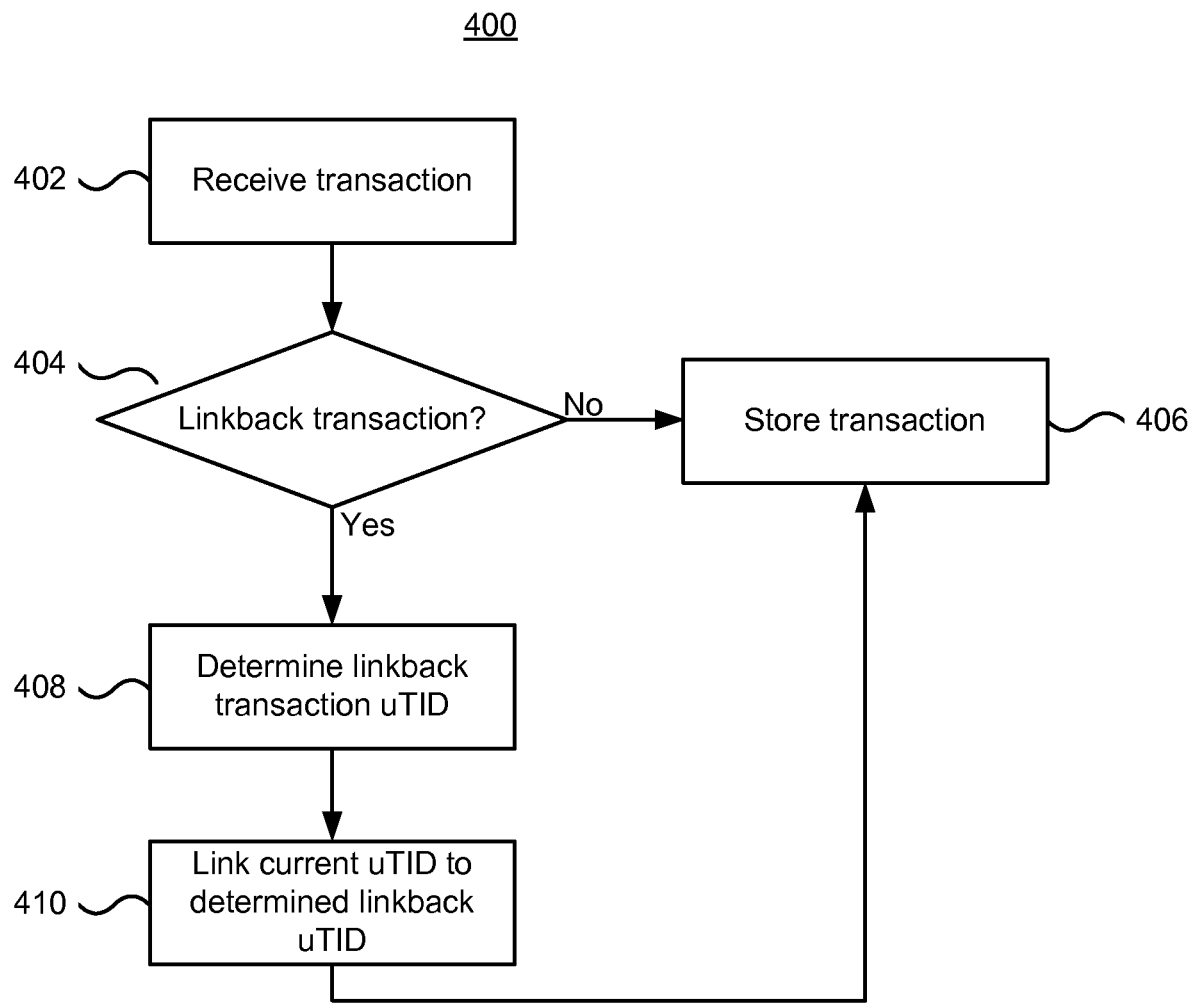
FIG. 4 depicts a method of linking transactions.

FIG. 4 depicts a method of linking transactions. The method 400 may be provided by the transaction linking functionality 222 described above with regard to FIG. 2. The method 400 begins with receiving a transaction (402). As described above, a transaction comprises a unique transaction identifier uTID and associated transaction information. The transaction may be received in real-time, or near real-time, from a retail location. Alternatively, the transactions may be periodically processed in batches. For example, the transactions may be temporarily stored, for example for an hour, multiple hours, a day or even multiple days, and then processed in a batch. Regardless of how each transaction is received, each transaction is eventually processed. Once the transaction is received, it is determined if the transaction is a link-back transaction (404). The transaction may be determined to be a link-back transaction based on the transaction type. The method may compare the type of the transaction to a plurality of transaction types that are link-back transaction types. The transaction type may be provided as a string or identifier associated with a transaction type. If the transaction is not a link-back transaction (No at 404) then the transaction is stored (406). If the transaction is a link-back transaction (Yes at 404), the method determines the uTID of the previous transaction the current transaction should be linked to (408). The link-back transaction may be determined from a portion of the transaction information, as well as the type of the transaction. The type of the transaction may be used to determine what type of transaction it is linked back to, for example a re-purchase transaction is linked back to a validation transaction. The portion of the transaction information can then be used to determine the previous transaction. The portion of the transaction information used to determine the previous transaction may uniquely identify the ticket that is related to both transactions. Once the associated link-back transaction is determined, the uTID of the current transaction is linked to the uTID of the link-back transaction (410). The uTIDs may be linked together by storing them together in a row of the transaction link-back table 218 described above. The once the transactions are linked, the current transaction may be stored (406).

As described above, as new transactions are stored in the transaction database, they are processed in order to determine if there is a previous transaction associated with the current transaction. The transaction information may also be used to flag transactions that can identify potentially risky retailer behavior.

A number of different types of risk assessments may be associated with a retailer ID. Each assessment may be associated with an event or behavior that is indicative of possible undesirable behavior of a retailer, or an increase in the likelihood that the retailer is involved in undesirable behavior. It is contemplated that the different risk assessments can be associated with different events. For example, an assessment can be associated with an actual offence charged against the retailer. Further assessments may be associated with consumer complaints, even if they do not lead to an actual offence being charged. Further, and as described below, an assessment may be associated with behavior of the retailer determined from the transaction information. As will be appreciated, different assessments may have a greater weight, or importance, in determining the risk associated with a retailer.

Figure 5:
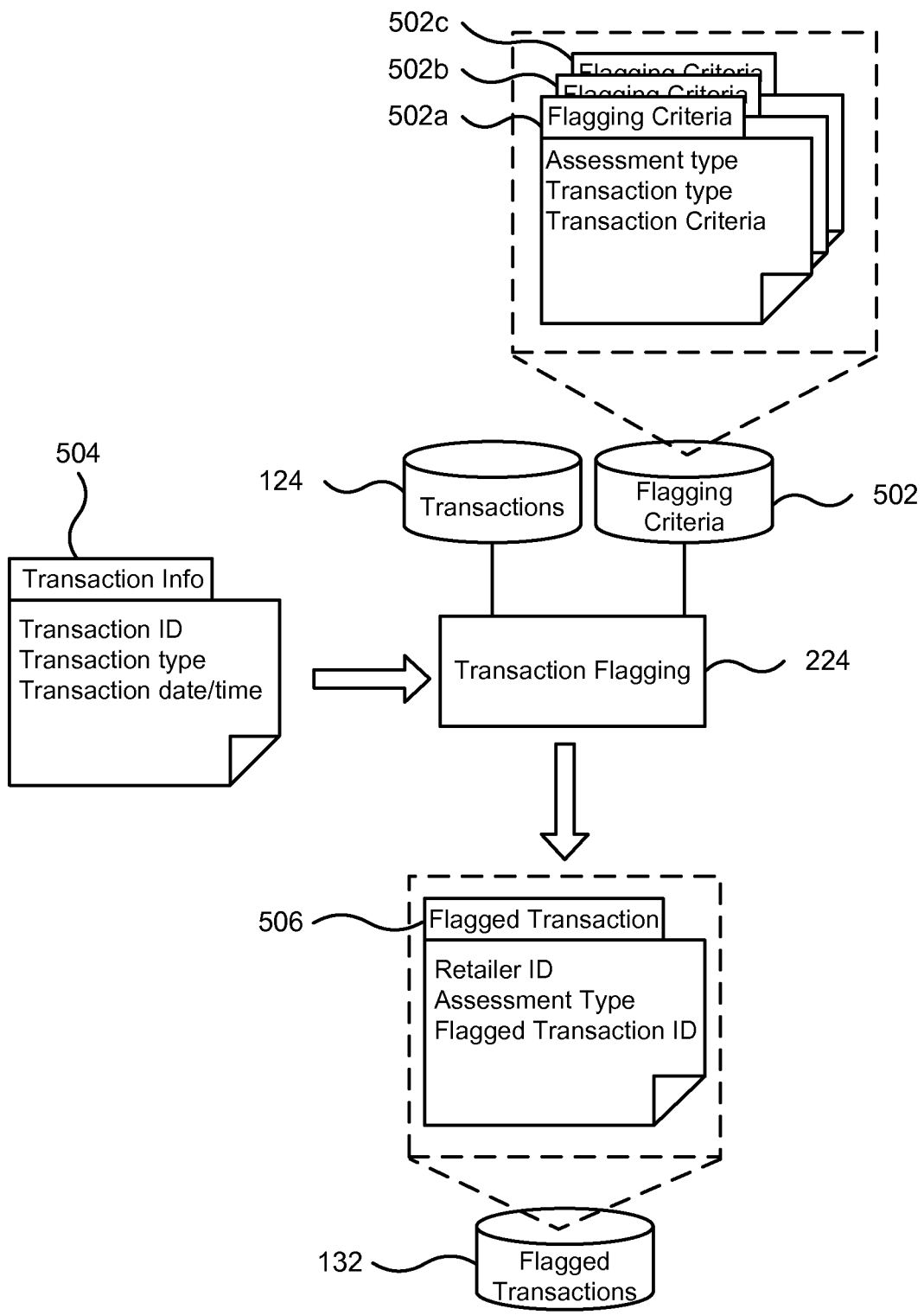
FIG. 5 depicts components for flagging risky transactions.

FIG. 5 depicts components for flagging risky transactions. Transaction flagging functionality 224 processes transaction information 504 of one or more transactions that are each identified by a transaction ID. The transaction information 504 for each transaction further includes a transaction type, and a transaction date and time. The transaction information 504 is only one possible implementation of storing the required information, it is contemplated that the transaction information 504 can be stored in a number of different specific implementation structures. The transaction information 504 may be provided separately from transaction information stored in the transaction database 124. Alternatively, the transaction information 504 may be provided as a link, or indication such as a unique transaction identifier, of the transaction information stored in the transactions database 124.

The transaction flagging functionality 224 further uses a plurality of flagging criteria 502 to determine if the transaction of the transaction information 504 should be flagged or not. As depicted the flagging criteria may be stored in a flagging criteria database, although it is contemplated that the flagging criteria could also be provided in other ways, such as a file, or as hard coded instructions of the transaction flagging functionality 224. The flagging criteria information 502 may include individual flagging criteria 502a, 502b, 502c that each include an assessment type specifying the assessment type of a transaction that is flagged as a result of the particular flagging criteria 502a, 502b, 502c. Each flagging criteria 502a, 502b, 502c may further comprise one or more transaction types that may be flagged by the particular flagging criteria as well as transaction criteria that specify one or more characteristics, and associated values if appropriate, of the transaction that will result in flagging a transaction. The transaction flagging functionality 224 may result in flagging a transaction in accordance with one of the particular flagging criteria 502a, 502b, 502c. A flagged transaction 506 may be stored in the flagged transaction database 132. Each flagged transaction may include a retailer identifier, an indication of the assessment type of the flagged transaction as well as an indication of the transaction ID that was flagged.

The transaction flagging functionality 224 flags transactions as potentially risky transactions, that is transactions that may be an indication that the retailer is involved in undesirable behavior, or has a higher risk of being involved in undesirable behavior. A transaction may be processed in order to determine if its characteristics match the transaction criteria of any of the flagging criteria, and if it does, the transaction may be flagged with the assessment type of the flagging criteria it matched.

The transaction criteria used for determining if a transaction should be flagged or not may vary depending upon various factors, including the different activities or behaviors of a retailer that are of concern for a specific lottery organization. Although the specific transaction criteria and the assessment types of the flagging criteria 502a, 502b, 502c may vary for different lottery organizations, the following are possible transactions that may be flagged.

A flagged transaction assessment may be associated with transactions for validation an instant win ticket where the ticket was validated using the secondary barcode. The assessment type may be a unique ID or text such as 'Secondary_Barcode' which can be used to identify assessments of this type. The flagging criteria may indicate that this type of assessment applies to validation transactions of instant tickets, and that the transaction criteria for flagging transactions is whether the validation was done using the secondary barcode of the ticket. Although there may be various legitimate reasons for validating a ticket with a secondary barcode, it may be indicative of a retailer pre-scanning tickets in order to purchase winning tickets, and as such may be indicative of undesirable behavior that contravenes the rules and/or regulations of the lottery corporation.

A further flagged transaction assessment may be associated with transactions that may be indicative of a retailer playing the lottery at work, which may be against rules or regulations of the lottery organization. The assessment type may be a unique ID or text such as 'No_Play_At_Work' which can be used to identify assessments of this type. The flagging criteria may indicate that this type of assessment applies to validation transactions of online wagers. The transaction criteria for flagging transactions may be that the validation transaction and the linked purchase, or wager, transaction both occurred at the same retailer and on the same day. Although, legitimate online wagers may be purchased and validated at the same retail location on the same day, it may be an indication that the retailer is wagering while at work, and as such may be indicative of undesirable behavior.

A further flagged transaction assessment may be associated with transactions for cancelling lost packs of instant win tickets. The assessment type may be a unique ID or text such as 'Lost_Packs' which can be used to identify assessments of this type. The flagging criteria may indicate that this type of assessment applies to transactions for cancelling packs of instant tickets. The transaction criteria for flagging transactions may simply be the occurrence of the transaction itself. Although there are legitimate situations when packs of instant lottery tickets are lost, and as such should be cancelled, it may be indicative of a retailer engaging in undesirable behaviour, for example by determining if any of the instant win tickets are winners prior to activating the pack and then reporting the pack as lost if none are winners.

A further flagged transaction assessment may be associated with transactions for cancelling free online tickets. The assessment type may be a unique ID or text such as 'Cancel_Free' which can be used to identify assessments of this type. The flagging criteria may indicate that this type of assessment applies to transactions for cancelling online tickets. The transaction criteria for flagging transactions may indicate to flag the cancelling transaction if the linked transactions indicate that the online ticket being cancelled was originally won from an instant win ticket. Although there are legitimate situations where a free ticket may be cancelled, it is an uncommon occurrence and may be indicative that a retailer is attempting to defraud a consumer.

A further flagged transaction assessment may be associated with transactions for validating tickets of a hybrid lottery game. The hybrid lottery game may comprise an instant win component and an online component. The assessment type may be a unique ID or text such as 'Split_Ticket_Hybrid' which can be used to identify assessments of this type. In a hybrid lottery game, the initial lottery ticket comprises two portions, namely an instant win portion and an online portion typically for a subsequent draw. If a consumer wins a free ticket as part of the instant win portion, a new exchange ticket may be printed for the online portion of the original ticket and a separate ticket may be provided for the free ticket. A split ticket occurs when the free ticket and the exchange ticket are validated at two different retail locations and one of the locations is the retail location where the original ticket was purchased. The flagging criteria may indicate that this type of assessment applies to transactions for validating tickets. The transaction criteria for flagging transactions may indicate that the transaction is flagged if a related ticket, either the exchange ticket or the free, has been validated at a different retail location. Although there are legitimate situations in which a consumer could validate a free ticket, and the related exchange ticket at different retail locations, the behaviour is unusual and may be indicative of possibly undesirable behaviour by the retailer.

A further flagged transaction assessment may be associated with transactions for validating a tickets of an online lottery game. The assessment type may be a unique ID or text such as 'Split_Ticket_Online' which can be used to identify assessments of this type. This type of assessment is similar to the Split_Ticket_Hybrid described above, however, for this type of assessment the two tickets being split are a free ticket won from an originally purchased online lottery game and a repurchase of the originally purchased online lottery game. The flagging criteria may indicate that this type of assessment applies to transactions for validating tickets. The transaction criteria for flagging transactions may indicate that the transaction is flagged if a related ticket, either the repurchase ticket or the free ticket, has been validated at a different retail location. Although there are legitimate situations in which a consumer could validate a free ticket, and the related repurchase ticket at different retail locations, the behaviour is unusual and may be indicative of possibly undesirable behaviour by the retailer.

A further flagged transaction assessment may be associated with transactions for redeeming a free ticket for a hybrid ticket. The assessment type may be a unique ID or text such as 'Instant_Wins_In_Queue' which can be used to identify assessments of this type. The flagging criteria may indicate that this type of assessment applies to transactions for redeeming a free ticket won from an instant portion of a hybrid lottery game. The transaction criteria for flagging transactions may indicate to flag the transaction if the redeeming transaction occurred more than a threshold period of time, such as 15 minutes after the initial validation of the winning ticket. Although there are legitimate situations where a free ticket may be redeemed more than 15 minutes after the initial validation, it is an uncommon and may be indicative that a retailer is attempting to defraud a consumer.

The transaction flagging functionality 224 may use the type of the transaction being processed to retrieve one or more possible flagging criteria that are associated with the same transaction type in order to reduce the amount of checking that needs to be performed. Once the relevant possible flagging criteria are retrieved, the individual transaction criteria can be checked to determine if the characteristics of the transaction being processed, and possibly linked transactions, match the transaction criteria.

Figure 6:
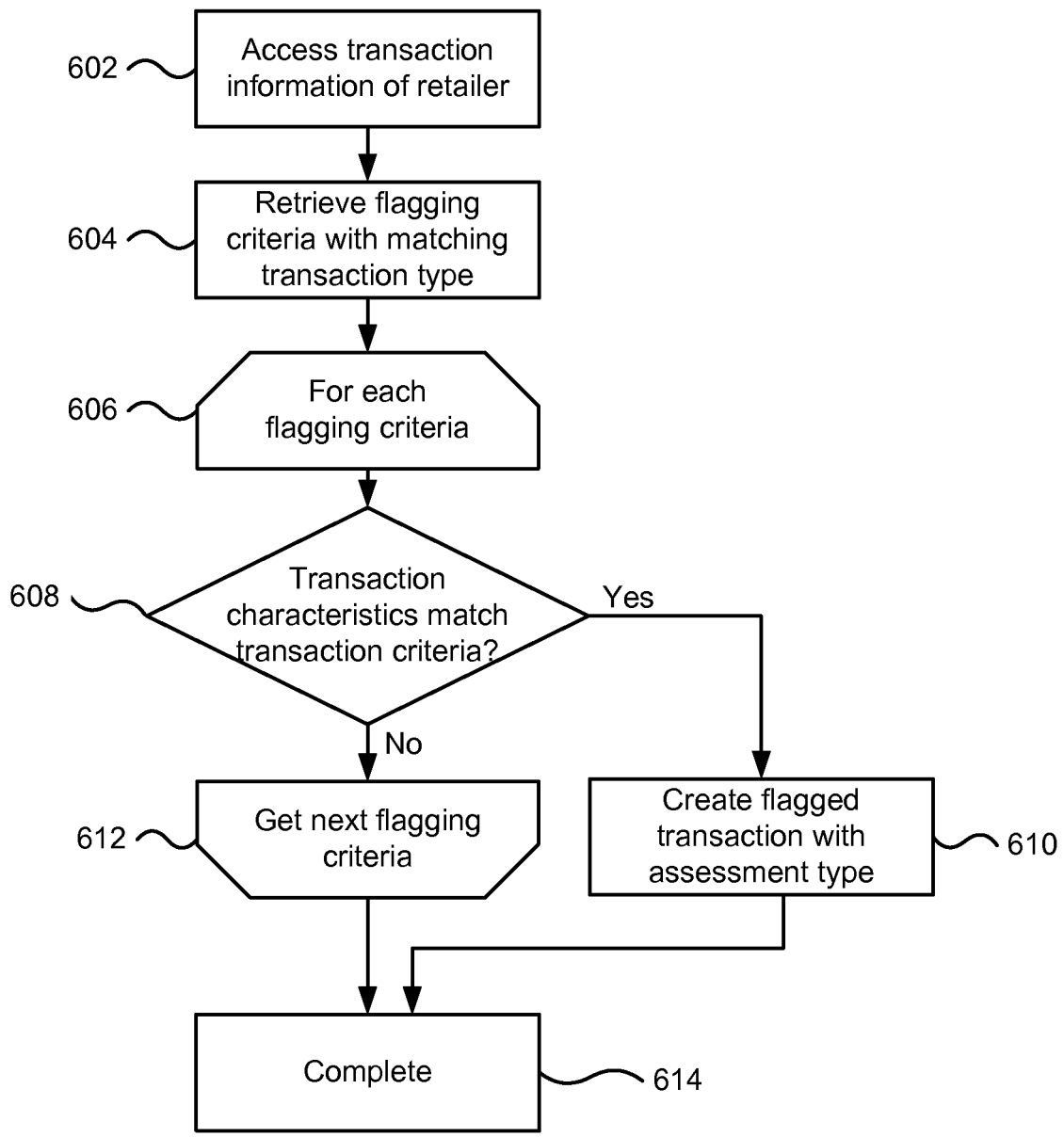
FIG. 6 depicts a method of flagging a transaction as an assessment.

FIG. 6 depicts a method of flagging a transaction as an assessment. The method 600 may be implemented by various components, including for example the transaction flagging functionality 224 described above. The method 600 accesses transaction information associated with a retailer (602), or more particularly a retail ID of a retailer. As described with regard to FIG. 6, it is assumed that the transaction information is a single transaction that occurred at the retail location. The transaction information may be stored in a transaction database or may be received from a retail location. The transaction information may identify a retail ID as well as a transaction type of the transaction. Flagging criteria that have a transaction type that matches the transaction type of the transaction being processed are accessed or retrieved (604). The flagging criteria may be stored in a database or other data structure or may be hardcoded into the transaction flagging functionality. One or more flagging criteria may be retrieved based on the transaction type. The method processes each of the flagging criteria. For each of the flagging criteria (606), the method determines if the transaction characteristics match the transaction criteria of the respective flagging criteria (608). The transaction criteria may specify numerous different transaction characteristics, such as a date and/or time of the transaction, the date and/or time of a previous linked transaction, the type of the transaction, as well as the type of other linked transactions as well as other characteristics of transactions. If the transaction characteristics of the accessed transaction match the transaction criteria of the flagging criteria (Yes at 608) a flagged transaction having the assessment type of the matched flagging criteria is created (610). The flagged transaction may be stored in the transaction database or in a different, or separate database such as the flagged transaction database 132. Once the flagged transaction is created the method 600 is completed. If the transaction characteristics do not match (No at 608), then the method gets the next flagging criteria if any (612), otherwise the method is complete (614).

Figure 7:
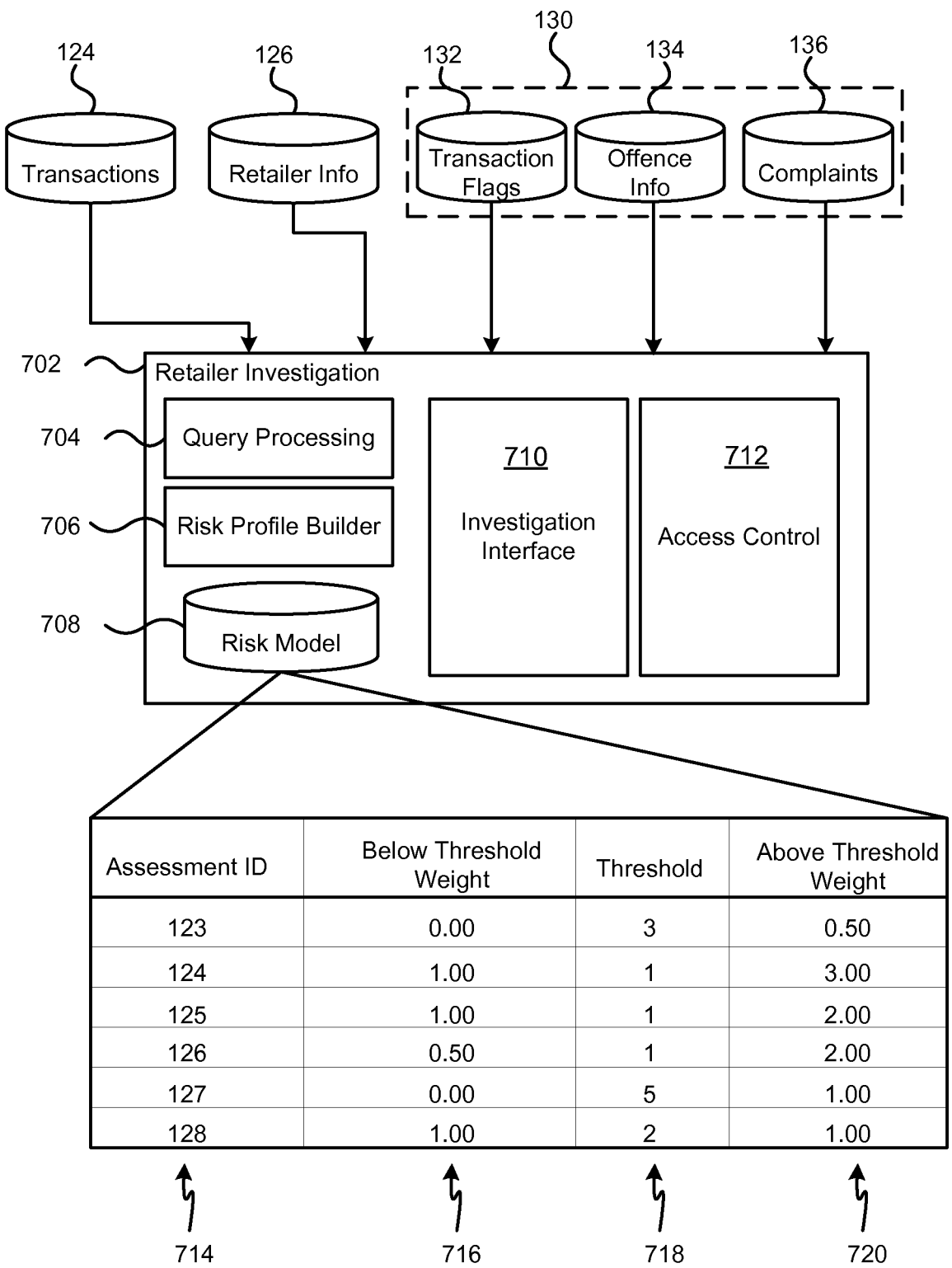
FIG. 7 depicts components of retailer investigation functionality.

FIG. 7 depicts components of retailer investigation functionality. The retailer investigation functionality 702 may provide the retailer investigation functionality of FIG. 1. The retailer investigation functionality 702 may comprise query processing functionality 704 that processes queries in order to access information stored in a database, such as retailer information 126, or assessment information 130, including flagged transactions 132, offence information 134 and complaint information 136. The retailer investigation functionality 702 may further comprise risk profile builder functionality 706 for building a risk profile of a retailer. The risk profile builder functionality 706 may utilize a retailer risk model 708 that provides an indication of the importance of the different possible assessment types to the retailer risk profile.

The retailer investigation functionality 702 may further comprise access control functionality 712 for controlling access to the investigation interface. The access control functionality 712 may control the access through the use of, for example, user name and password verification. The access control functionality 712 may utilize information stored in a database, such as employee names, user names, passwords, position and clearance to control the functionality provided to different users.

The retailer investigation functionality 702 may comprise investigation interface functionality 710. The investigation interface functionality 710 provides an interface to users for interacting with the retailer investigation functionality, including accessing the information stored in the databases 124, 126, 132, 134, 136. The investigation interface functionality 710 may utilize query processing functionality 702 for retrieving information from the databases 124, 126, 132, 134, 136. Risk profile builder functionality 708 may provide functionality for building a risk profile of a retailer based on the assessment information, which may include information on complaints received, offences issued and flagged transactions as described above.

The risk profile builder 706 determines the assessment information associated with a particular retailer and generates the risk profile by applying appropriate weightings to the assessments. The risk model 708 may provide a plurality of weightings to be applied to each of the different assessment types. As depicted, the risk model provides a plurality of assessment IDs 714, each of which may be associated with a first threshold weighting value 716, a threshold value 718 and a second threshold weighting value 720. The first weighting value provides a weighting value to apply to the occurrences of the associated assessment type when the number of occurrences is equal to our less than the threshold value. If the number of occurrences of a particular type of assessment is greater than the threshold value, then the first weighting value is applied to the threshold value and the second weighting value is applied to the difference between the number of occurrences of the assessment type and the threshold value. By using a first weighting value to apply to assessment occurrences below or equal to a threshold and a second weighting value to apply to occurrences above the threshold, the importance of a particular type of assessment can be varied based on the number of occurrences. For example, for a particular assessment type it may be common or acceptable for a particular number of occurrences; however, above a certain threshold it may be indicative of possible undesirable behavior.

The particular threshold values and weighting values may be periodically calculated from the risk profile information. By periodically calculating the threshold and weighting values, the risk profiles can be generated to identify risky behavior relative to other retailer profiles. That is, the risk profiles may be periodically, for example one a month, one a year or other time frame, processed to identify the average number of various assessments. The threshold values for each assessment may be based on the distribution of the assessment numbers. For example, the threshold value may be set at twice the standard deviation of the number of assessments assessed against retailers.

Figure 8:
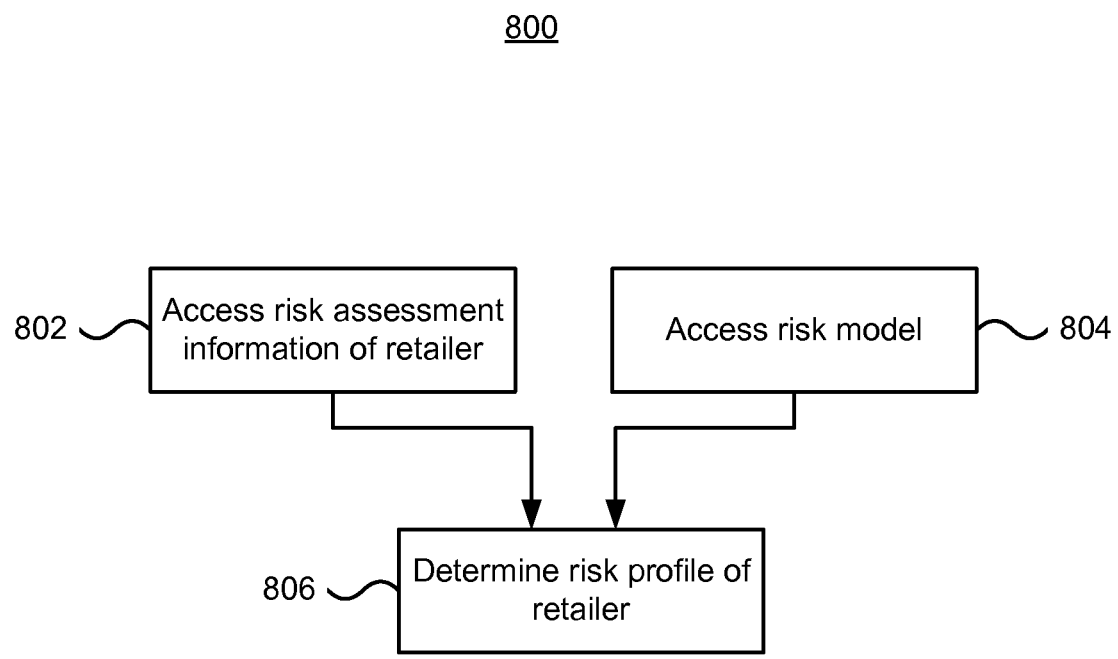
FIG. 8 depicts a method of determining a risk profile of a retailer.

FIG. 8 depicts a method of determining a risk profile of a retailer. The method 800 may be implemented for example by the risk profile builder functionality 706. The method 800 comprises accessing risk assessment information associated with a retailer (802). As described above, the risk assessment information may comprise complaints received from consumers, offences against the retailer, and transactions that were flagged as potentially risky transactions. The assessment information may comprise a plurality of individual assessments, each associated with a retailer ID and a respective assessment type. The method 800 also accesses a risk model (804). The risk model may specify weighting values to apply to respective assessment types. The risk model may specify a plurality of weighting values and a threshold value to use in applying the weighting values. That is the first weighting value may be applied to assessment occurrences below the threshold and the second weighting value may be applied to assessment occurrences above the threshold. Once the risk model and the assessment information are accessed, the method can determine the risk profile for the retailer (806) by applying the weightings of the risk model to the assessments against the retailer. The retailer risk profile may comprise a respective value for each of the assessment types determined from the weightings in the model and the number of occurrences of the assessment types.

Figure 9:
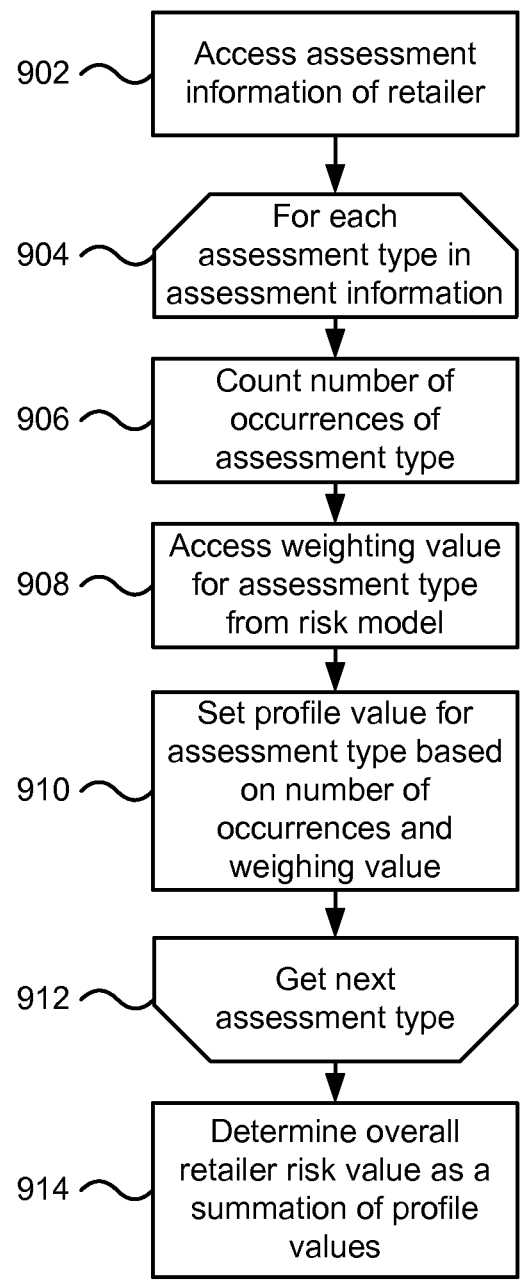
FIG. 9 depicts a further method for determining a risk profile of a retailer.

FIG. 9 depicts a further method for determining a risk profile of a retailer. The method 900 accesses assessment information associated with a particular retailer (902), or more particularly a retail ID. The assessments used in determining a retailer risk profile may be the assessments that have occurred in a time window, such as the past month or past year. The time window used in determining which risk assessments to base the retailer risk profile on may be adjustable or may be fixed. The risk profile of retailers may be periodically updated to adjust the window of assessments included in the risk profile.

Once the relevant assessments are accessed or retrieved, the method processes each of the different assessment types in the assessments. For each assessment type in the accessed assessment information (904), the number of occurrences of the assessment type is counted (906) and the weighting value for the assessment type is accessed or retrieved from the retail risk model (908). The method sets a profile value for the assessment type in the retailer risk profile based on the number of occurrences of the assessment type and the weighting value (910). The method then gets, and processes, the next assessment type (912). Once all of the assessment types have been processed, the method may determine an overall retail risk value as a summation of profile values (914). The overall retail risk value may be used to rank the individual retailers, which may facilitate easily identifying retailers with the highest risk of being involved in undesirable behavior.

Figure 10:
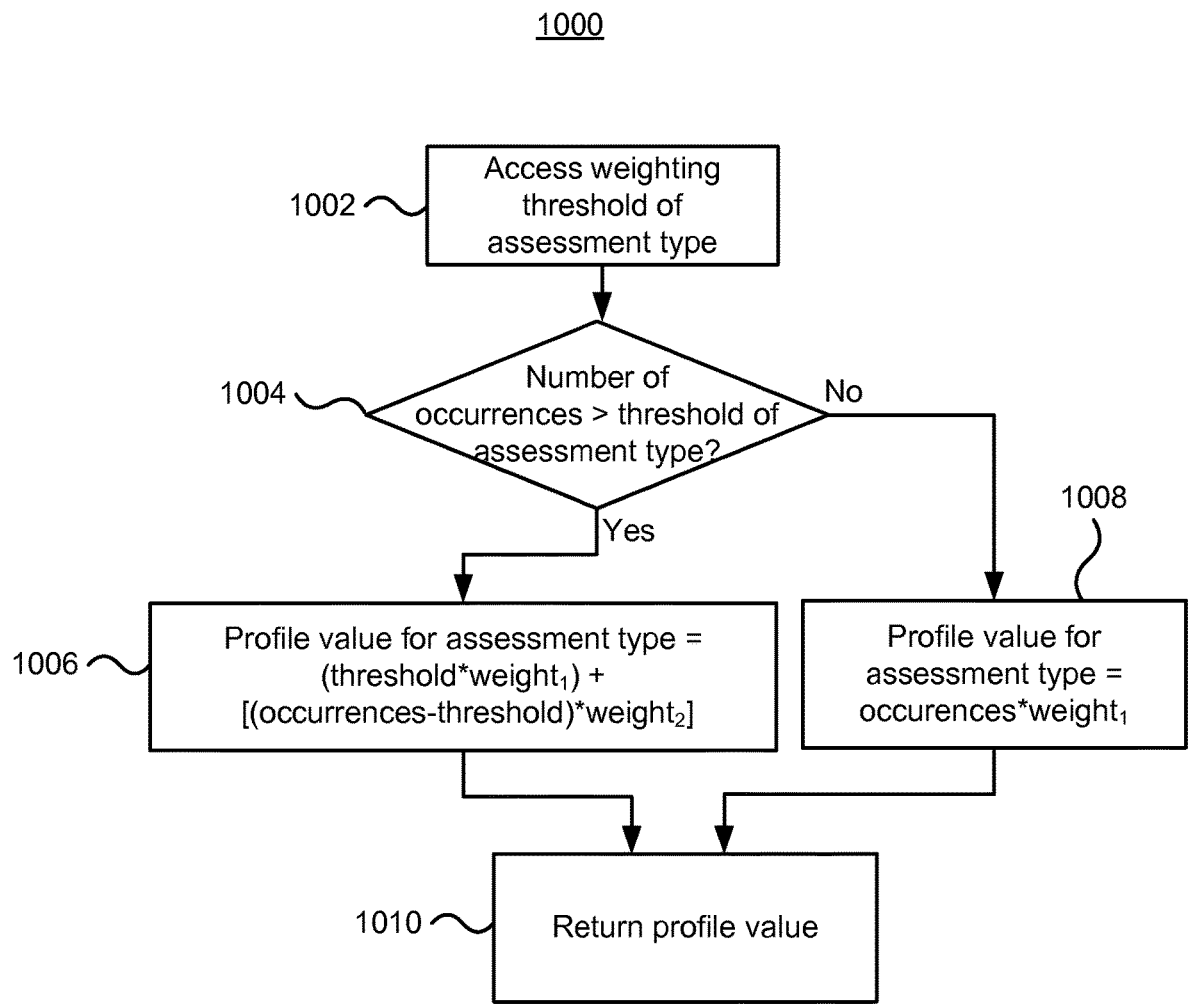
FIG. 10 depicts a method for determining a value for an assessment type in a retailer risk profile.

FIG. 10 depicts a method for determining a value for an assessment type in a retailer risk profile. The method 1000 comprises accessing a weighting threshold of an assessment type in the retailer risk model (1002). The method then determines if the number of occurrences of the assessment type is greater than the threshold value (1004). If the number of occurrences is greater than the threshold (Yes at 1004), the method sets the profile value for the assessment type equal to the threshold value times the first weighting value plus the second weighting value multiplied by the difference between the number of occurrences and the threshold value (1006). If the number of occurrences of the assessment type is less than or equal to the threshold (No at 1004), the profile value for the assessment type is set to the product of the number of occurrences of the assessment type and the first weighting value (1008). Once the profile value is set, either using the first weighting, or both the first and second weighting, the profile value can be returned (1010).

Figure 11:
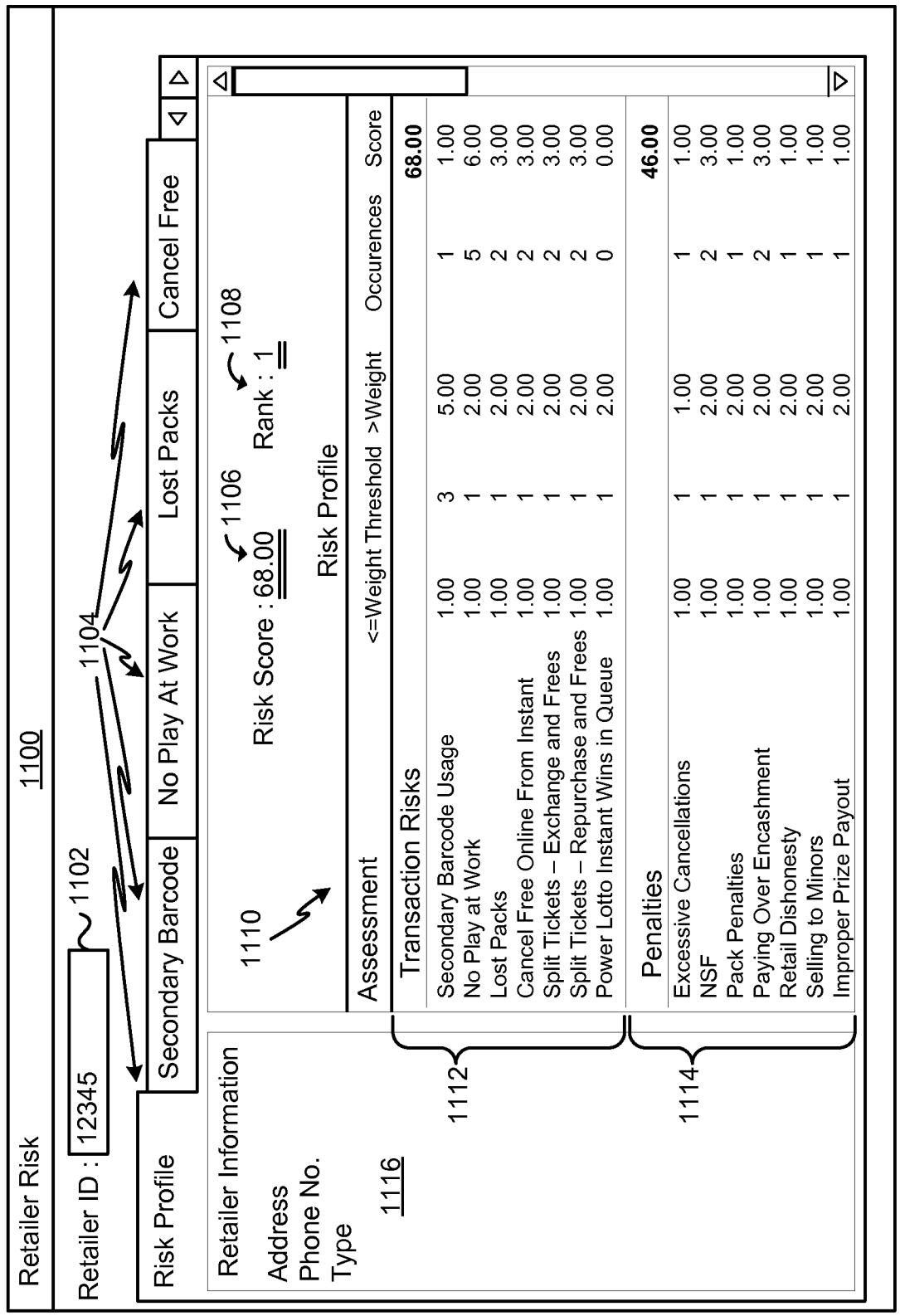
FIG. 11 depicts a user interface for displaying retailer risk profile information.

FIG. 11 depicts a user interface for displaying retailer risk profile information. The user interface may comprise a window 1100. The user interface may include a text box 1102, or other input mechanism, for specifying a retailer ID. Although not depicted in FIG. 11, it is contemplated that the user interface 1100 may additionally or alternatively provide an input means to specify the retailer by another means, such as a retail name, a retail location, an ID of a retail device installed in the retail location. The user interface 1100 may comprise a plurality of tabs 1104 for displaying various information. As depicted, the tabs 1104 may comprise a risk profile tab that displays risk profile information. The displayed risk profile information may include an overall risk profile score 1106, and a rank of the retailer 1108. The displayed risk profile information may also comprise the risk profile details 1110. The details may display the individual assessments, including risky transaction assessments 1112 and offence assessments 1114. The individual assessments may be displayed with the associated weightings and threshold values, as well as the number of occurrences of the assessment type and the resultant profile value. The user interface may further display retailer information, such as the address of the retailer, the phone number, and a retailer type. Additional tabs 1104 may display additional information on the one or more risky transaction assessments. For example, the secondary barcode tab may display detailed transaction information for the transactions associated with the secondary barcode assessment. Similarly, detailed information can be displayed for transactions associated with the other risky transaction assessments.

The systems and methods described above provide functionality for managing lottery information, including determining a risk profile of retailers of the lottery system. The system and methods described herein have been described with reference to various examples. It will be appreciated that components from the various examples may be combined together, or components of the examples removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

What is claimed is:

1. A system for use in investigating retailers of a lottery for potentially risky behavior, the system comprising:
   a plurality of retail terminals, each of the retail terminals coupled to a communication network and configured for purchasing and validating tickets;
   at least one administration access device;
   an information management system coupled to the network, each of the plurality of retail terminals, and each of the at least one administration access device, the information management system comprising:
      at least one processing unit for executing instructions; and
      at least one memory unit for storing instructions, the instructions when executed by the at least one processing unit configuring the system to provide:
         a transactions database storing information pertaining to interactions with the lottery system received from the plurality of retail terminals, each of the plurality of interactions stored as a respective transaction associated with a unique transaction ID and a transaction type;
         a flagged transactions database storing flagged transactions;
         transaction flagging functionality for:
            accessing transaction information of at least one transaction stored in the transactions database;
            retrieving one or more flagging criteria, each specifying an assessment type, a transaction type and transaction criteria, the one or more flagging criteria retrieved when the transaction type of the respective flagging criteria matches the transaction type of the at least one transaction of the transaction information;
            determining that the transaction criteria of at least one of the retrieved flagging criteria matches characteristics of the at least one transaction of the transaction information;
            generating a flagged transaction assessment with an assessment type of the flagging criteria associated with the transaction criteria matching the characteristics of the at least one transaction, a flagged transaction ID and a retailer ID of a retailer associated with the transaction information; and
            storing the generated flagged transaction assessment in the flagged transactions database; and
         retailer investigation functionality for:
            providing on at least one of the administration access devices an investigation interface allowing an investigator to provide an indication of a retailer associated with a retailer identifier (ID);
            accessing risk assessment information associated with the retailer ID of the lottery retailer, the risk assessment information providing an indication of one or more risk infractions assessed against the lottery retailer, each of the one or more assessed risk infractions comprising a flagged transaction assessment stored in the flagged transactions database and associated with a respective unique assessment type identifier (ID) of a plurality of predetermined assessment type IDs;
            accessing a retailer risk model defining a respective weighting value to apply to each one of the plurality of predetermined assessment type IDs;
            determining a risk profile for the lottery retailer from the one or more assessed risk infractions and the weightings determined from the accessed retailer risk model;
            displaying in the investigation interface a representation of the determined risk profile;
            receiving from the investigation interface a selection of one of the assessment type IDs used in determining the risk profile corresponding to the representation of the determined risk profile displayed on the at least one of the administration access devices; and
            displaying in the investigation interface details of the assessed risk infractions associated with the received query retailer ID having the selected assessment type ID.

2. The lottery system of claim 1, wherein determining the risk profile comprises:
   determining a number of occurrences of each type of risk infraction in the risk assessment information;
   determining values for each type of risk infraction in the risk assessment information, each respective value determined based on the number of occurrences of the respective type of risk infraction and the weighting of the type of risk infraction in the risk profile; and
   determining an overall risk number as a summation of the individual values for each type of risk infraction in the risk assessment information.

3. The lottery system of claim 2, wherein the risk profile defines a respective first weighting value, a second weighting value and a threshold value for each one of the plurality of predetermined risk type IDs, wherein determining the respective value for each type of risk infraction in the risk assessment information comprises:
   determining the respective value as a product of the first weighting value and the number of occurrences of the respective type of risk infraction when the number of occurrences is less than or equal to the threshold associated with the respective type of risk infraction in the retailer risk profile; and
   determining the respective value as a sum of a first product of the first weighting value and the threshold associated with the respective type of risk infraction in the retailer risk profile and a second product of the second weighting value and a difference between the number of occurrences and the threshold when the number of occurrences of the type of the risk infraction is greater than the threshold associated with the respective type of risk infraction in the retailer risk profile.

4. The lottery system of claim 1, wherein the retailer investigation functionality further comprises risk profile functionality for:
- determining an overall risk number for each of a plurality of retailers, each of the respective overall risk numbers determined as a summation of individual values of the respective retailer profile; and
- determining a ranking of each of the retailers based on the determined overall risk number of each of the retailers.

5. The lottery system of claim 1, wherein the retailer investigation functionality further comprises risk profile functionality for:
- receiving updated risk assessment information; and
- updating the risk profile based on the updated risk assessment information.

* * * * *